United States Patent [19]
Philbrick et al.

[11] 3,805,160
[45] Apr. 16, 1974

[54] METHOD FOR NON-CONTACT SEMICONDUCTOR RESISTIVITY MEASUREMENT

[75] Inventors: John W. Philbrick, Poughkeepsie; Charles A. Pillus, Beacon; Michael R. Poponiak, Newburgh; Christian P. Schneider, Wappingers Falls, all of N.Y.

[73] Assignee: International Business Machines Corporation, Armonk, N.Y.

[22] Filed: Apr. 25, 1972

[21] Appl. No.: 247,489

[52] U.S. Cl................. 324/158 D, 324/40, 324/62
[51] Int. Cl....................... G01r 31/26, G01r 27/02
[58] Field of Search......... 324/158 D, 40, 62, 3, 65; 331/65

[56] References Cited
UNITED STATES PATENTS

| | | | |
|---|---|---|---|
| 2,018,080 | 10/1935 | Martienssen | 324/3 |
| 3,234,461 | 2/1966 | Trent et al. | 324/62 |
| 2,505,778 | 5/1950 | Limbach | 324/40 |
| 2,859,407 | 11/1958 | Henisch | 324/158 D |
| 3,234,458 | 2/1966 | Bean et al. | 324/40 |

*Primary Examiner*—Alfred E. Smith
*Assistant Examiner*—Ernest F. Karlsen
*Attorney, Agent, or Firm*—Daniel E. Igo; Wesley DeBruin

[57] ABSTRACT

The apparatus and technique discloses a method for measuring the resistivity of semiconductor material over several decades by varying the inductance of a RF energized coil and where the method is significantly independent of operating frequency, type of semiconductor material and the nature of the sample surface and surface and surface condition or preparation.

6 Claims, 4 Drawing Figures

PATENTED APR 16 1974          3,805,160

METHOD FOR NON-CONTACT SEMICONDUCTOR RESISTIVITY MEASUREMENT

BACKGROUND OF THE INVENTION

1. Field of the Invention

The production of semiconductor devices often necessitates the measurement of resistivity of ingots and single crystals formed from such semiconductor materials as silicon, germanium, III-V compounds destined for further processing into such discrete devices as transistors, diodes and the like. The conventional resistivity measurements of the type referred to above are made by suitable metal contacts to select points on a semiconductor material specimen and passing a current therethrough. These measurements of resistivity are taken only at specified selected contact points and does not lend itself to the measure of resistivity at a variety of discrete regions on a semiconductor material surface without contacting the surface of said material. The measurements of resistivity provides a convenient estimate of doping levels in semi-conductor materials which have been subjected to diffusion processing. Similarly, the measurement of resistivity parameters are essential in the manufacturing and evaluation of light emitting diodes manufactured from binary and tertiary compositions formed from group III-V and group IV of the periodic table of elements.

2. Brief Description of the Prior Art

Eddy current applications have long been utilized to measure the resistivity of metals. Such techniques embody capacitive and inductive coupling as well as microwave method applications. The measurement of resistivity in semiconductor materials provides among other things a convenient estimate of doping levels in such materials and is customarily measured in ohm centimeters.

Several instruments and techniques have been developed which measure the resistivity of materials by loading the coil of a Q-meter. The Q of any coil is the ratio of a specified frequency of the inductive impedance of the coil to the resistance of coil and a Q meter is a device for measuring the Q of coil.

The Hanish U.S. Patent, No. 2,859,407, discloses a hollow coil having a predetermined value of Q and coupled to a Q-meter. The meter conventionally comprises an oscillator having an adjustable frequency and a vacuum tube voltmeter having a scale calibrated in values of Q. A series circuit comprising the coil and a variable capacitor is connected across the oscillator and the voltmeter is coupled across the capacitor. The capacitor is adjusted to cause a series circuit to resonate at the selected frequency. The oscillator frequency is then adjusted to the same frequency. The power level of the oscillator is adjusted until the meter indicates some convenient Q-value. This is a typical application for utilizing an electrically energized coil having a given first Q-value and a source of radiation energy. The energized coil is adapted to direct its radiation axially through said coil to measure the resistivity of a semiconductor specimen as well as the minority carrier life time of the semiconductor material by a measurement of the change of the Q of the coil when the material is placed in close proximity thereto.

The above techniques are believed to be limited to a narrow resistivity range determined by the particular electronics and the probe combination utilized. Some of these methods are contact methods and are tedious and often inconvenient for use in automated manufacturing schemes. In most cases these methods of resistivity measurements cover from 1 to 1.5 decades of resistivity above and below a fixed resistivity value. Obviously this is a limiting factor in semiconductor manufacture and processing especially where bulk material with resistivity ranging over 4 decades is a common experience.

BRIEF SUMMARY OF THE INVENTION

It is an object of this invention to provide a method and technique for non-contact resistivity measurements of semiconductor and other materials.

It is still a further object of this invention to provide an apparatus for resistivity measurements independent of the nature of the semiconductor material and the nature of the surface thereof.

A still further object of this invention is to provide a technique for instrument arrangement whereby the resistivity of semiconductor specimens are measured rapidly and reproducibly without contacting the sample on the specimen being measured.

It is still a further object of this invention to provide a method and technique useful in instrument apparatus design whereby a wide variety of resistivity measurements can be accomplished in both directions from an arbitrary center span on norm.

A further object of the invention is to provide a method and apparatus for measuring the resistivity of semiconductor material independent of the composition being tested.

The foregoing and other objects are accomplished by providing a method for applying coils of various inductances to a semiconductor which is maintained in close proximity to said coil and a means for energizing the aforesaid coil with radio frequency energy measuring the power absorption of the sample and determining the resistivity of the specimen utilizing a known calibration curve or set of curves. Alternatively, the RF current going to the coil could be measured. In another alternative embodiment the coil could form one element of the tuned circuit of a marginal oscillator and the strength of the oscillator measured. This strength would decrease as power is drawn from the coil by the sample or specimen. Any of the power absorption RF current or strength of oscillators will be termed response (R).

The foregoing and other objects, features and advantages of the invention will be more apparent from the following more particular description of preferred embodiments of the invention as illustrated in the accompanying drawings.

BRIEF DESCRIPTION OF THE DRAWINGS

FIG. 2A may be varried to the Abscissa units in ohm-centimeters provided all specimen to be tested are substantially the same thickness.

Figure 1:
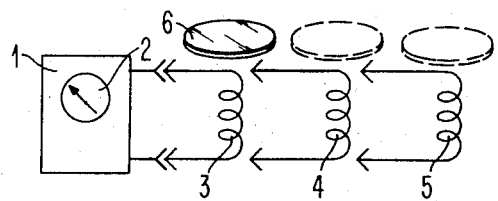
FIG. 1 is a schematic illustration of the apparatus suitable for carrying out the described invention.
Figure 2A:
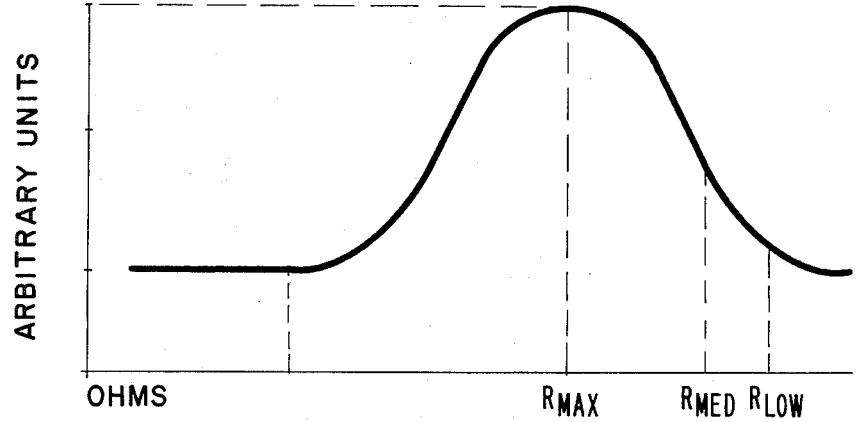
FIG. 2A is a typical log response curve of samples showing various resistivities where the vertical axis plots the response in arbitrary units and the horizontal axis plots the specific sheet resistivity of the sample in ohms which is the ratio of the resistivity in ohm centimeters to thickness of the specimen in centimeters.
Figure 2B:
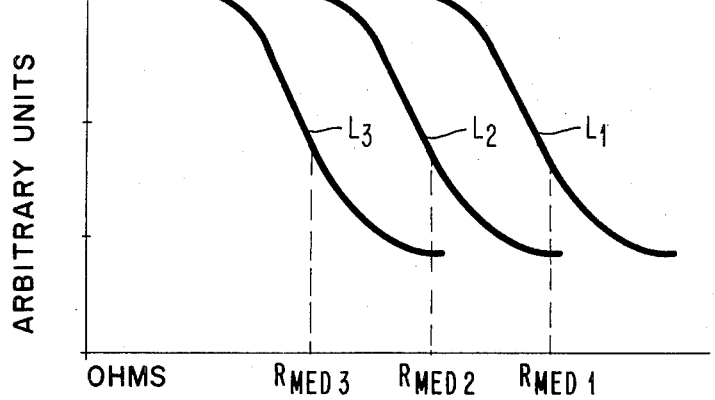
FIG. 2B is a set of calibration curves each curve being a portion of a log response curve illustrated in FIG. 2A between R low and R maximum for three specific coils of known and predetermined inductance.

Referring now to the drawings, an apparatus as illustrated in FIG. 1 is provided wherein a radio frequency source 1 having a power emission measuring means 2 is connected to one of a series or set of interchangeable coils 3, 4, and 5 which are capable of being individually energized by the radio frequency source 1. Any suitable means is provided so that the specimen 6 is placed in close proximity to the one of the coils in the set series being energized. The operation of the apparatus in resistivity measurements which will be subsequently described in detail comprised exposing the wafers 6 to the RF field emanating from the coil and measuring the power absorption delta resulting from having a sample in place against a void or a no specimen in place. The resulting power absorption or delta is transposed to a standard calibration curve illustrated in FIG. 2B and from which the resistivity of the specimen can be read directly.

The coil set or series have identical diameters and length but different inductances. A specific inductance value of a coil is capable of measuring a response above and below a particular resistivity median for a specific coil having an individual inductance value. Consequently, varying inductance coils are used to provide a means and method for resistivity measurements over a wide span or range of values.

The invention is further illustrated and described by the following example which is for illustrative purposes only and not intended to limit or otherwise confine the invention herein described.

EXAMPLE I

A set of six coils, each one-fourth inch in diameter and one-fourth inch in length and having inductance values ranging from 0.28 microhenries to 80 microhenries were provided and having each connectable to a RF source and meter. With a coil of given inductance connected to the meter, the response of the system consisting of coil, RF source and meter to each of 28 samples of silicon semiconductor wafers of constant thickness but of resistivities ranging from 125 ohm centimeters to $2.5 \times 10^{-3}$ ohm centimeters was measured and plotted on log-log paper to form a curve similar to one of the curves illustrated in FIG. 2B. The values for $R_{(medium)}$ from each of these curves was then plotted against the inductance value of the coil used to generate a calibration curve. A coil of inductance 0.8 microhenries was then connected to the RF source and meter, and a specimen of silicon semiconductor material of unknown resistivity having a thickness of 0.40 inch was placed in close proximity to the coil. As illustrated in FIG. 1 the system response was 54 this enabled the sheet resistivity of the sample to be determined as 0.31 ohms by use of calibration curves developed above the resistivity of the unknown was then calculated by multiplying the sheet resistance by the thickness.

EXAMPLE II

A similar procedure outlined in Example 1 was carried out using apparatus as depicted in Example 1 and a sample of GaAs of an unknown resistivity having a thickness of 9.8 mils was placed upon a coil of inductance 0.28 microhenries. The system response was 16.7 the sheet resistance of the sample was determined to be $3.5 \times 10^{-2}$ ohms, and the resistivity was calculated to be approximately $8.7 \times 10^{-4}$ ohm-cm by multiplying the sheet resistance by the sample thickness.

EXAMPLE III

Figure 3:
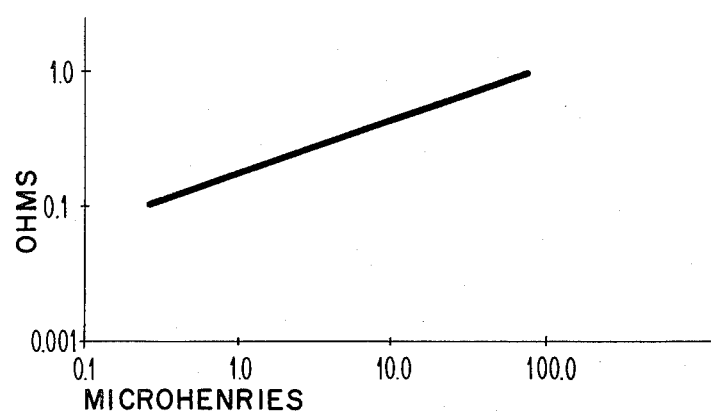
FIG. 3 is a plot of the medium resistivity point of the curves in FIG. 2A versus inductance of the illustrated coils of FIG. 1.

It being desirable to measure semiconductor material with a sheet resistance greater than 500 ohms, a coil having an inductance of about 0.1 microhenries was selected based upon the data plotted in a curve similar to FIG. 3. The coil was connected to the RF source and meter. A beaker full of water to which had been added various concentrations of salt yielding various resistivity values was placed upon it. A calibration curve similar to one of the curves in FIG. 2B was generated using the resistivity of the salt water as calibration standard. Subsequently a large cylinder of polycrystalline silicon was placed on the coil and the response of the system to this polycrystalline silicon recorded. The resistivity of the polycrystalline silicon was then determined by interpreting the response data with the aid of the calibration curve. Therefore by using the known variation of the range of response with the inductance of the sensing coil, we were able to measure the resistivity of the polycrystalline silicon material.

A coil with a given inductance value connected to an apparatus as shown in FIG. 1 is capable of measuring the resistivity of samples having values about one order of magnitude above and below a resistivity ($R_{med}$) specific to that inductance.

The resistivity of semiconductor materials such as silicon, germanium, and compounds of and mixtures thereof of I-VII, II-VI, and III-V of the periodic system and other materials having semiconductor properties, is capable of being measured in accordance with this invention.

It is desirable in the production of single crystal silicon semiconductor substrates to evaluate the proximity and defect structure of polycrystalline raw material utilized in the manufacture of monocrystalline silicon semiconductor ingots. Polycrystalline silicon may have impuritity regions. Occasionally these impurity areas or regions appear near or close to the central rod and can adversely dope the ultimate single crystal material.

Ordinarily these defect regions are detected by cutting core samples perpendicular to the polycrystalline charge and refining the said core to a single crystal and making electrical measurements of the resultant material.

In accordance with the present invention the above mentioned impurity regions can be determined directly utilizing the trace curve technique. This is accomplished by utilizing a coil as described in Example III and slowly moved over the coil in close proximity thereto and recording the response (R) as previously described on an X=Y recorder whereby the ordinate displays the response and the Abscissa displaying the position.

A similar procedure is readily adaptable for comparable resistivity measurements as a function of position across the surface or diameter of a single crystal slice or wafer of semiconductor material such as silicon.

While the invention has been particularly shown and described with reference to preferred embodiments thereof, it will be understood by those skilled in the art that various changes in form and detail may be made therein without departing from the spirit and scope of the invention.

What is claimed is:

1. A method for non-contact resistivity measurement of semiconductor material which comprises providing coils of different inductance, energizing one coil with a measured amount of radio frequency energy, placing said semiconductor material in close proximity to said coil and measuring the difference between the radio frequency energy before and after having said material in proximity to said coil, said radio frequency energizing being terminated while placing said semiconductor material in proximity to said coil and recommenced after said material is placed near said coil, said semiconductor material being subsequently placed in proximity to a series of different coils having different inductance.

2. A method in accordance with claim 1 wherein said semiconductor material is selected from the group consisting of germanium, silicon and compounds of group I-VII, II-VI, III-V and mixtures of said compounds.

3. A method in accordance with claim 1 wherein said semiconductor material is silicon.

4. A method in accordance with claim 1 wherein said compound is selected from the group consisting of gallium arsenide, gallium arsenide phosphide, gallium aluminum phosphide, and gallium aluminum arsenide.

5. A method in accordance with claim 1 wherein said semiconductor material is monocrystalline.

6. A method in accordance with claim 1 wherein said material is polycrystalline.

* * * * *